United States Patent [19]
McMahon et al.

[11] Patent Number: 5,345,664
[45] Date of Patent: Sep. 13, 1994

[54] METHOD FOR CHANGING BRAKE SPRINGS AND SHOES

[76] Inventors: Garald C. McMahon; Kevin M. McMahon, both of 17 W 114 91st St., Hinsdale, Ill. 60521

[21] Appl. No.: 61,011
[22] Filed: May 14, 1993
[51] Int. Cl.⁵ .................. B23P 6/00; B23P 19/04; B23P 15/18
[52] U.S. Cl. .................. 29/402.08; 29/227; 29/233; 29/426.6
[58] Field of Search .................. 29/225, 227, 233, 267, 29/270, 271, 272, 273, 426.6, 173, 402.01, 402.03, 402.08; 7/100; 254/10.5, 131; 81/486, 488

[56] References Cited

U.S. PATENT DOCUMENTS

| | | | |
|---|---|---|---|
| 2,489,434 | 11/1949 | Riccio | 29/227 |
| 2,490,160 | 12/1949 | Riccio | 29/227 |
| 2,839,820 | 6/1958 | Bates | 29/227 |
| 3,602,973 | 9/1971 | Mata | 29/227 |
| 3,891,185 | 6/1975 | Lett | 254/10.5 |
| 4,870,737 | 10/1989 | Navarro | 29/227 |
| 5,003,680 | 4/1991 | Uesely et al. | 29/227 |
| 5,095,603 | 3/1992 | Carruthers et al. | 29/267 X |
| 5,165,154 | 11/1992 | Miller | 29/227 |

FOREIGN PATENT DOCUMENTS 376980  7/1932  United Kingdom .................. 29/227

*Primary Examiner*—Peter Dungba Vo
*Attorney, Agent, or Firm*—Rhodes & Ascolwello

[57] ABSTRACT

A method for installing and removing brake springs and brake shoes in a vehicle involves the following steps: removing a wheel from the vehicle and removing a brake hub from the vehicle (If the brake assembly is situated on an apparatus other than a vehicle, the step of removing the wheel is not included.), placing an end of an elongated lever having a bifurcated gripping member on a lip of a lower brake shoe, rotating the elongated lever clockwise causing the lower brake shoe to rotate outwardly from a contracted position to an extended position, removing a lower cam roller, placing the end of the elongated lever having the bifurcated gripping member on a lip of an upper brake shoe, rotating the elongated lever counterclockwise causing the upper brake shoe to rotate outwardly from a contracted position to an extended position, removing an upper cam roller, placing another end of the elongated lever having a bifurcated grasping member around a brake spring shaft of a brake spring, placing an upper edge of a brake cam into a cam lifting and restraining notch on the elongated lever, using a point of contact of the upper edge of the brake cam and the cam lifting and restraining notch as a fulcrum and rotating the elongated lever clockwise, removing a brake spring restraining hook on the brake spring from a brake spring restraining member and removing the lower brake shoe and the upper brake shoe are the remaining steps. Assembly is accomplished by reversing the above steps.

1 Claim, 5 Drawing Sheets

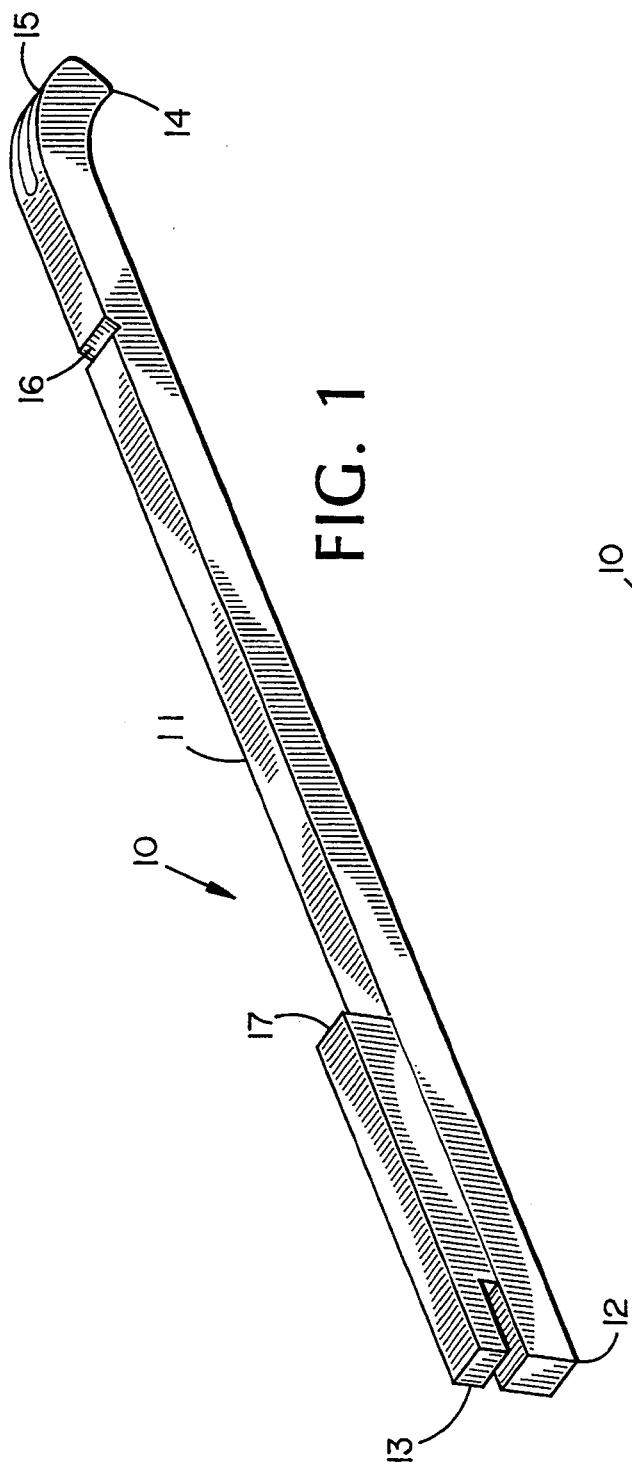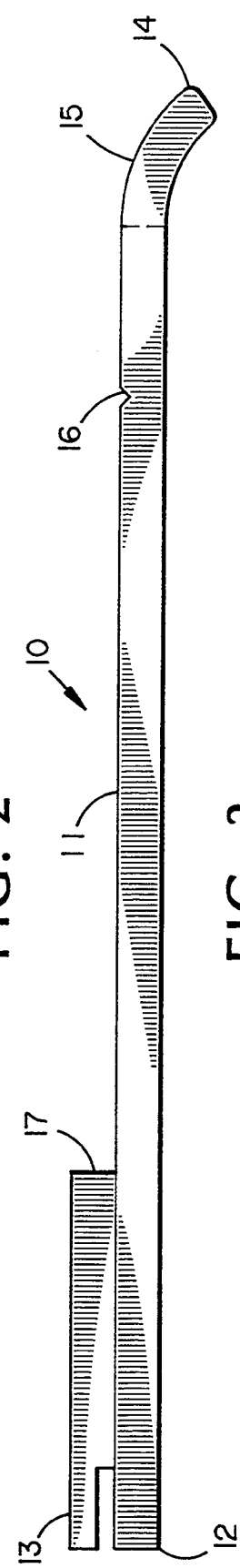

METHOD FOR CHANGING BRAKE SPRINGS AND SHOES

BACKGROUND OF THE INVENTION

1. Field of the Invention

This invention relates to a tool for the removal and installation of brake springs and brake shoes.

2. Description of the Related Art

Replacing the brakes on a vehicle can be a very demanding task. One that can be very labor and tool intensive. Many attempts have been made to lessen the amount of time, labor and tools required for this job.

U.S. Pat. No. 3,602,973 to S.G. Mata on Sep. 07, 1971 for a Brake Shoe Spreading Hand Tool shows a plier-like tool to spread apart and lock in place a set of brake shoes to facilitate their removal and assembly.

U.S. Pat. No. 3,891,185 to L.W. Lett on Jun. 24, 1975 describes a Brake Shoe Hold Down Spring Tool that has two threadingly operated spurs that compress and hold a spring to assist in the spring's removal.

U.S. Pat. No. 4,870,737 to R. Navarro on Oct. 03, 1989 shows a Brake Spring Removal Tool that has several outwardly projecting spurs on a handle that engage a spring in order to twist and lift the spring from its attachment point.

U.S. Pat. No. 5,003,680 to I. Vesely, et al. on Apr. 02, 1991 describe a Tool for Fitting and Removing brake Shoe Return Springs that has hooks to engage the brake springs and o-ring to reduce the chance of the spring becoming dislodged from engagement with the hook. The tool has a shank with a handle to twist the spring and disengage it from attachment to the brake shoe.

The present tool assists the user to perform many of the tasks required to remove and replace brake shoes and brake springs from locations in a vehicle and in other locations where brakes are required. The tool has many advantages over the related art and reduces the time required for and the tools necessary for disassembly and reassembly of a brake assembly.

SUMMARY OF THE INVENTION

Almost every brake assembly has shoes and springs. Removing and replacing the brakes and springs can be an arduous task and can be fraught with skinned knuckles. The springs must be removed to relieve the pressure they assert on the components to which they are attached. This would, at first blush, appear to be a relatively simple task. However, all the components of a brake assembly are, of necessity, in a very close relationship to each other. There is not much room to maneuver a tool or to insert a hand or even fingers to grasp or turn a piece of the assembly. This task is especially difficult when it has to be performed at a remote location or outside in the cold or rain. One needs a tool that will perform many functions and will save time. The tool described herein performs many of the required manipulations in a timely fashion especially on large trucks. It is constucted of strong metal such as steel and is designed to handle small to large assemblies. This tool is corrosion resistant, designed to be serviceable and should enhance a mechanic's collection of favored tools.

A tool for installing and removing brake springs and brake shoes is described has an elongated lever having a longitudinal length, a substantially constant width transverse to the longitudinal length, and an upper surface. A first terminal end of the tool has a bifurcated gripping member that includes a single lower tine and a single upper tine, the upper and lower tines being spaced from one another by a single slot, and each of tine terminates at a distal end of the slot. A second terminal end of the tool has a bifurcated grasping member. The second terminal end has an arcuate portion curving downward from the longitudinal axis and away from the upper surface of the elongated lever. There is a notch forward in the upper surface of the elongated lever, the notch being disposed substantially adjacent the bifurcated grasping member. The notch can be placed on a cam to faciliate lifting or restraining actions performed upon the brake assembly. The tool may have an impacting surface on the elongated lever.

Using the tool described above or a similar device, a method for installing and removing brake springs and brake shoes in a vehicle is described that involves removing a wheel from the vehicle and removing a brake hub from the vehicle (If the brake assembly is situated on an apparatus other than a vehicle, the step of removing the wheel is not included.). Another step is placing the first terminal end of an elongated lever having a bifurcated gripping member on a lip of a lower brake shoe and then rotating the tool clockwise causing the lower brake shoe to rotate outwardly from a contracted position to an extended position. The next step is removing a lower cam roller. Placing the first terminal end of the tool having the bifurcated gripping member on a lip of an upper brake shoe is another step. A further step is rotating the tool counterclockwise causing the upper brake shoe to rotate outwardly from a contracted position to an extended position. The next step is removing an upper cam roller. Proceeding on to the next steps, a user of the tool continues by placing the second end of the tool having a bifurcated grasping member around a brake spring shaft of a brake spring and by placing an upper edge of a brake cam into a cam lifting and restraining notch on the elongated lever. The process is continued by using a point of contact of the upper edge of the brake cam and the cam lifting and restraining notch as a fulcrum and rotating the tool clockwise. First, then a second, brake spring restraining hook on the brake spring from a first, then a second brake spring restraining member, respectively and removing the lower brake shoe and the upper brake shoe are the remaining steps. Assembly is accomplished by reversing the above steps. The first step in restoring the brake assembly is installing the lower brake shoe and the upper brake shoe. The next step is installing a first brake spring restraining hook on the brake spring to a first brake spring restraining member, then placing the second end of the installation tool having a bifurcated grasping member around the brake spring shaft of the brake spring, and by using a point of contact of the upper edge of the brake cam the cam lifting and restraining notch as a fulcrum, rotating the installation tool clockwise. A further step includes installing a second brake spring restraining hook on the brake spring to a second brake spring restraining member, then placing the first terminal end of said installation tool on a lip of a lower brake shoe, then rotating the installation tool clockwise causing the lower brake shoe to rotate outwardly from a contracted position to an extended position. A lower cam roller is then installed. The process continues by placing the first terminal end of the installation tool having the bifurcated gripping member on a lip of an upper brake shoe, then rotating the installation tool counterclockwise causing the upper brake shoe to rotate outwardly from a contracted position to an extended position. An upper cam roller is then installed.

It is an object of this invention to provide a tool to remove and install brake springs and brake shoes in a more efficient manner.

BRIEF DESCRIPTION OF THE DRAWINGS

FIG. 1 is a perspective view of a tool for removing and installing brake springs and brake shoes.

FIG. 2 is a top plan view.

FIG. 3 is a left side elevational view.

DESCRIPTION OF THE PREFERRED EMBODIMENTS

Figure 4:
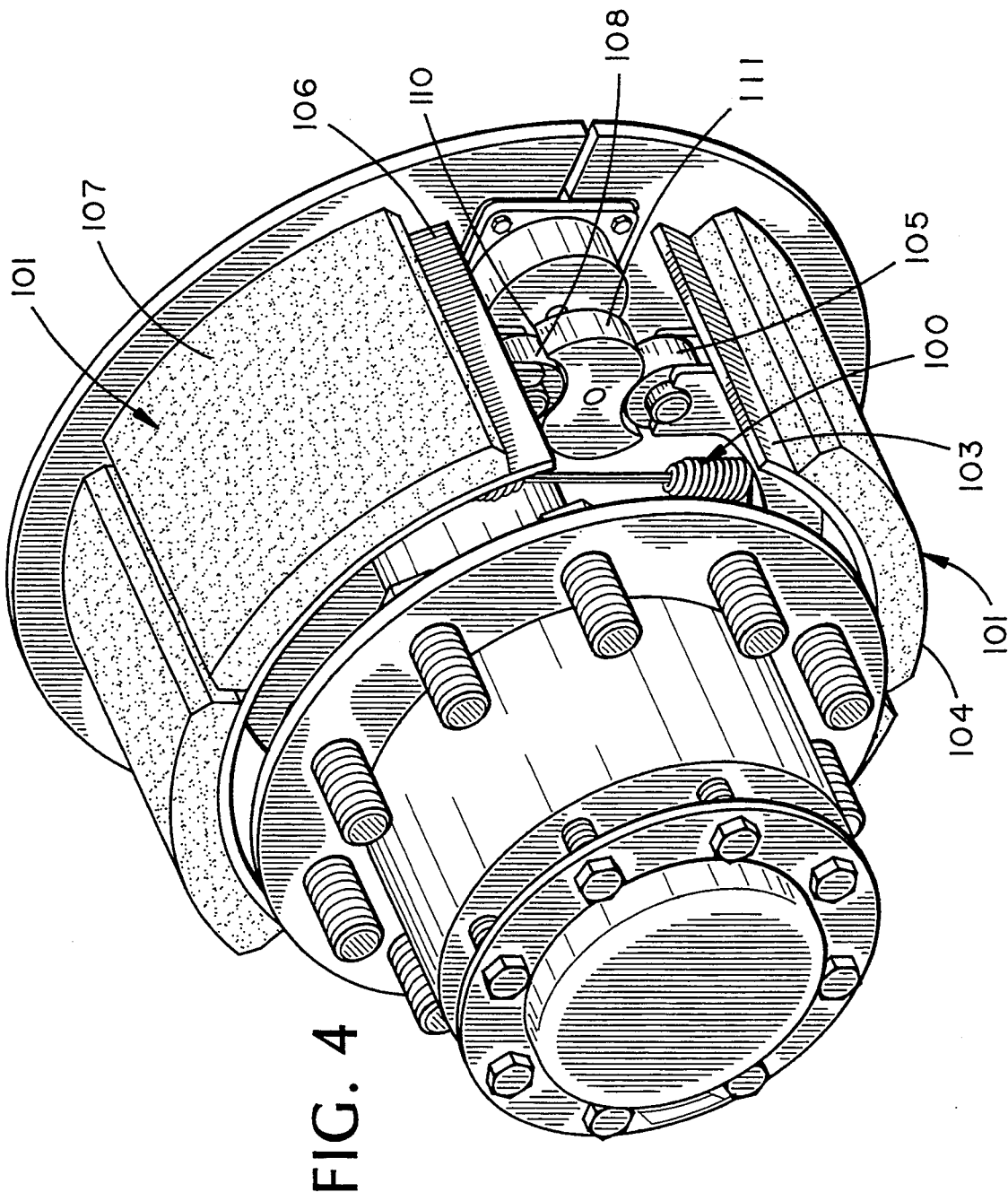
FIG. 4 is a perspective view of a brake assembly shown to depict the various parts removed by the tool. The lower and upper cam rollers are shown in place and the lower and upper brake shoes are shown in the contracted position.
Figure 5:
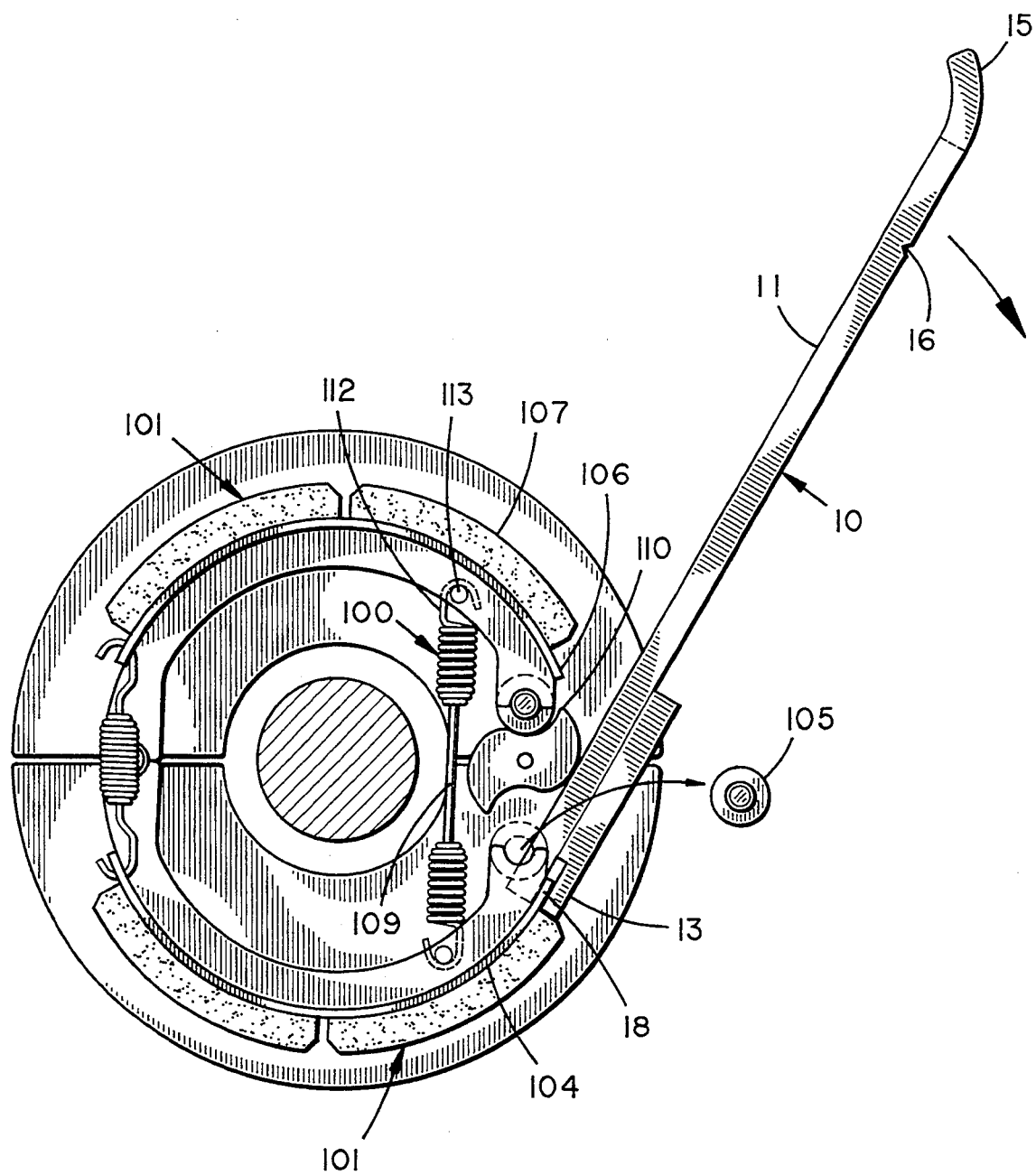
FIG. 5 is a front elevational view of the brake assembly with a forward portion of the assembly removed to better illustrate removing the lower roller cam. The lower brake shoe is shown rotated downwardly to an extended position and the lower cam roller is shown removed and off to the side.
Figure 6:
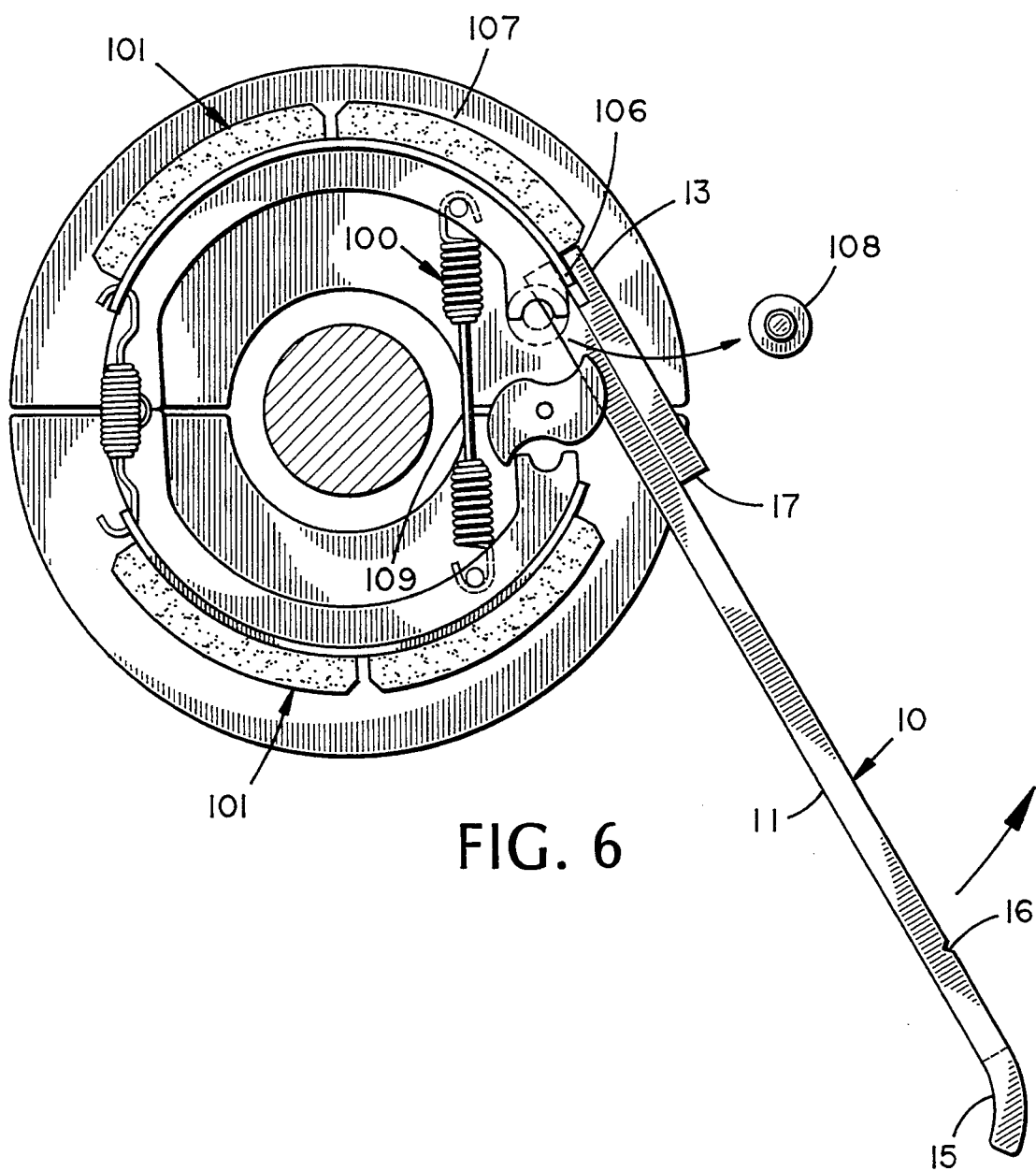
FIG. 6 is a front elevational view of the brake assembly with a forward portion of the assembly removed to better illustrate the step of removing the upper cam roller. The upper brake shoe is shown rotated upwardly to an extended position and the upper cam roller is shown removed and off to the side.

Referring to FIGS. 1 through 7, a tool 10 for installing and removing brake springs 100 and brake shoes 101 is described that has an elongated lever 11. An end 12 of the elongated lever 11 has a bifurcated gripping member 13 that includes a single lower tine and a single upper tine spaced from the lower tine by a single slot, neither of the lower or upper tines extending beyond the distal end of the slot. Another end 14 of the elongated lever 11 has a bifurcated grasping member 15. There is a cam lifting and restraining notch 16 on the elongated lever 11. The tool 10 may have an impacting surface 17 on the elongated lever 11.

Figure 7:
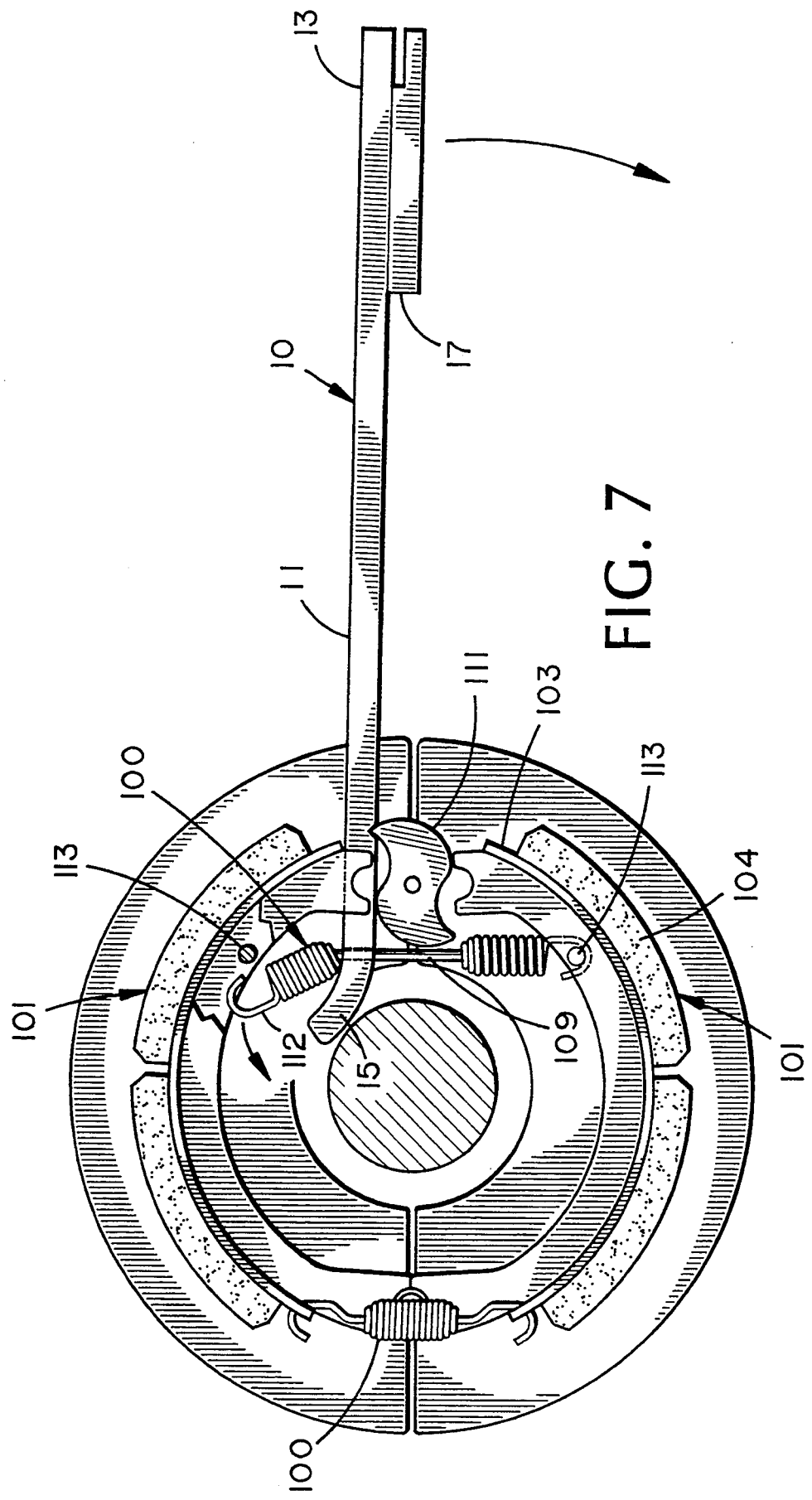
FIG. 7 is a front elevational view of the brake assembly with a forward portion of the assembly removed to better illustrate grasping the spring shaft to remove the brake spring and shows using the upper edge of the cam as a fulcrum. The brake spring is shown removed from a brake spring retaining member.

Using the tool 10 described above or a similar device, a method for installing and removing brake springs 100 and brake shoes 101 in a vehicle (not shown) is described that involves removing a wheel (not shown) from the vehicle and removing a brake hub (not shown) from the vehicle (If the brake assembly is situated on an apparatus other than a vehicle, the step of removing the wheel is not included.). Another step is placing an end 12 of an elongated lever 11 having a bifurcated gripping member 13 on a lip 103 of a lower brake shoe 104 and then rotating the elongated lever 11 clockwise causing the lower brake shoe 104 to rotate outwardly from a contracted position (shown in FIG. 4) to an extended position (shown in FIG. 5). The next step is removing a lower cam roller 105. Racing the end 12 of the elongated lever 11 having the bifurcated gripping member 13 on a lip 106 of an upper brake shoe 107 is another step. A further step is rotating the elongated lever 11 counterclockwise causing the upper brake shoe 107 to rotate outwardly from a contracted position (shown in FIG. 4) to an extended position (shown in FIG. 6). The next step is removing an upper cam roller 108. Proceeding on to the next steps, a user of the tool 10 continues by placing another end 14 of the elongated lever 11 having a bifurcated grasping member 15 around a brake spring shaft 109 of a brake spring 100 and by placing an upper edge 110 of a brake cam 111 into a cam lifting and restraining notch 16 on the elongated lever 11 (as shown in FIG. 7). The process is continued by using a point of contact of the upper edge 110 of the brake cam 111 and the cam lifting and restraining notch 16 as a fulcrum and rotating the elongated lever 11 clockwise. Removing a brake spring restraining hook 112 on the brake spring 100 from a brake spring restraining member 113 and removing the lower brake shoe 104 and the upper brake shoe 107 are the remaining steps. Assembly is accomplished by reversing the above steps.

The first step in restoring the brake springs 100 and brake shoes 101 involves installing the lower brakes shoe 104 and the upper brake shoe 107. The next step is installing a first brake spring restraining hook 112 on the brake spring 100 to a first brake spring restraining member 113, then placing the end of the installation tool 10 having a bifurcated grasping member 15 around the brake spring shaft 109 of the brake spring 100, and by using a point of contact of the upper edge 110 of the brake cam 111 and the cam lifting and restraining notch 16 as a fulcrum, rotating the installation tool 10 clockwise. A further step includes installing a second brake spring restraining hook 112 on the brake spring 100 to a second brake spring restraining member 113, then placing the end of said installation tool 10 having a gripping member 13 on a lip 103 of a lower brake shoe 104, then rotating the installation tool 10 clockwise causing the lower brake shoe 104 to rotate outwardly from a contracted position (shown in FIG. 4) to an extended position (shown in FIG. 5). A lower cam roller 105 is then installed. The process continues by placing the end of the installation tool 10 having the bifurcated gripping member 13 on a lip 106 of an upper brake shoe 107, then rotating the installation tool 10 counterclockwise causing the upper brake shoe 107 to rotate outwardly from a contracted position (shown in FIG. 4) to an extended position (shown in FIG. 6). An upper cam roller 108 is then installed.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. A method for changing brake springs and shoes comprising:
    (a) removing a brake hub;
    (b) grasping an installation tool for installing and removing brake springs and brake shoes, said installation tool comprising:
    an elongated lever member having a longitudinal length, a substantially constant width transverse to said longitudinal length, and an upper surface;
    a first terminal end of said elongated lever member comprising a bifurcated gripping member that includes a single lower tine and a single upper tine;
    said single slot having a distal end coinciding with said first terminal end;

each of said lower tine and said upper tine terminating at the distal end of said single slot; and a second terminal end of said elongated lever member comprising a bifurcated grasping member; and placing the first terminal end of said installation tool on a lip of a lower brake shoe;

(c) rotating the installation tool clockwise causing the lower brake shoe to rotate outwardly from a contracted position to an extended position;

(d) removing a lower cam roller;

(e) placing the first terminal end of the installation tool having the bifurcated gripping member on a lip of an upper brake shoe;

(f) rotating the installation tool counterclockwise causing the upper brake shoe to rotate outwardly from a contracted position to an extended position;

(g) removing an upper cam roller;

(h) placing the second end of the installation tool having a bifurcated grasping member around a brake spring shaft of a brake spring;

(i) placing an upper edge of a brake cam into a cam lifting and restraining notch on the elongated lever;

(j) using a point of contact of the upper edge of the brake cam and the cam lifting and restraining notch as a fulcrum and rotating the installation tool clockwise;

(k) removing a first, then a second, brake spring restraining hook on the brake spring from a first, then a second, brake spring restraining member, respectively;

(l) removing the lower brake shoe and the upper brake shoe;

(m) installing the lower brake shoe and the upper brake shoe;

(n) installing a first brake spring restraining hook on the brake spring to a first brake spring restraining member;

(o) placing the second end of the installation tool having a bifurcated grasping member around the brake spring shaft of the brake spring;

(p) using a point of contact of the upper edge of the brake cam and the cam lifting and restraining notch as a fulcrum and rotating the installation tool clockwise;

(q) installing a second brake spring restraining hook on the brake spring to a second brake spring restraining member;

(r) placing the first terminal end of said installation tool on a lip of a lower brake shoe;

(s) rotating the installation tool clockwise causing the lower brake shoe to rotate outwardly from a contracted position to an extended position;

(t) installing a lower cam roller;

(u) placing the first terminal end of the installation tool having the bifurcated gripping member on a lip of an upper brake shoe;

(v) rotating the installation tool counterclockwise causing the upper brake shoe to rotate outwardly from a contracted position to an extended position; and (w) installing an upper cam roller.

* * * * *